(12) United States Patent
Scott

(10) Patent No.: US 7,628,366 B2
(45) Date of Patent: Dec. 8, 2009

(54) CEILING MOUNT

(75) Inventor: Craig Cameron Scott, Delta (CA)

(73) Assignee: VTC Electronics Corporation, Taipei (TW)

( * ) Notice: Subject to any disclaimer, the term of this patent is extended or adjusted under 35 U.S.C. 154(b) by 228 days.

(21) Appl. No.: 11/515,617

(22) Filed: Sep. 5, 2006

(65) Prior Publication Data

US 2008/0054148 A1 Mar. 6, 2008

(51) Int. Cl.
*B42F 13/00* (2006.01)

(52) U.S. Cl. .................. 248/343; 248/317; 411/551; 348/374

(58) Field of Classification Search .............. 248/317, 248/342, 343, 344, 220.21, 220.22, 222.11, 248/222.13, 222.52, 222.21; 362/382, 404; 411/337, 347, 348, 551; 439/537; 348/374, 348/144
See application file for complete search history.

(56) References Cited

U.S. PATENT DOCUMENTS

| 1,785,709 | A | * | 12/1930 | Campau | ............... | 411/368 |
|---|---|---|---|---|---|---|
| 2,877,818 | A | * | 3/1959 | Johnson | ............... | 411/107 |
| 3,561,719 | A | * | 2/1971 | Grindle | ............... | 248/343 |
| 4,634,345 | A | * | 1/1987 | Stanek et al. | ........... | 416/244 R |
| 5,273,452 | A | * | 12/1993 | Donato et al. | ............... | 439/339 |
| 6,779,911 | B2 | * | 8/2004 | Chang | ............... | 362/430 |
| 6,992,723 | B1 | * | 1/2006 | Wulf et al. | ............... | 348/374 |
| 7,150,596 | B2 | * | 12/2006 | Diaz et al. | ............... | 411/344 |
| 7,192,303 | B2 | * | 3/2007 | Kohen | ............... | 439/537 |
| 7,229,057 | B2 | * | 6/2007 | Cavell | ............... | 248/343 |
| 7,334,767 | B2 | * | 2/2008 | Wright | ............... | 248/342 |

FOREIGN PATENT DOCUMENTS

| GB | 928004 | 3/1962 |
|---|---|---|
| GB | 2416371 | 1/2006 |
| JP | 2002004356 | 1/2000 |

OTHER PUBLICATIONS

United Kingdom Application No. GB0717108.5, Combined Search and Examination Report, Nov. 16, 2007, 6 Pages.

* cited by examiner

*Primary Examiner*—J. Allen Shriver
*Assistant Examiner*—Todd M. Epps
(74) *Attorney, Agent, or Firm*—Frenkel & Associates, P.C.

(57) ABSTRACT

A ceiling mount includes a base adapted to engage with one side of the ceiling, a core extending through the base to securely connect to the base and having a cylindrical body provided with at least one indentation, at least one arm selectively extending out of and movably received in the at least one indentation of the cylindrical body for engagement with the other side of the ceiling so as to provide a supporting force, at least one threaded bolt rotatably mounted in the cylindrical body and operably connected to the at least one arm to allow the at least one arm to extend out of and move relative to the cylindrical body in response to the rotational movement of the at least one threaded bolt and a stop to avoid the at least one arm from further extending.

13 Claims, 6 Drawing Sheets

CEILING MOUNT

BACKGROUND OF THE INVENTION

1. Field of the Invention

The present invention relates to a ceiling mount, and more particularly to ceiling mount having two wings selectively extending outward from a central rod to abut a face of a ceiling so as to support a load attached to a base of the central rod.

2. Description of the Prior Art

During renovation or decoration of a building, a ceiling light is the most popular object to be chosen to enhance the soft touches to the building. For its easy installation and maintenance, a lot of ceiling lights are used in modern constructions. While mounting the ceiling light, a fixing mount is required to support the load of the ceiling light such that the operator is able to readily adjust the angle of the ceiling light. Other than the ceiling light, lighting instruments of different kinds to be mounted on the ceiling also require a fixing mount so as to support the load of the lighting instruments. Other applications such as the surveillance camera also needs a fixing mount to support the weight of the camera.

With reference to FIG. 6, a fixing mount is composed of a base (51) and a casing (51) securely yet detachably connected to the base (51). The casing (52) is circular in shape so that after the base (51) is mounted on the ceiling (not shown) via threaded holes defined through the base (51) and threaded bolts (not shown), the operator is able to install an object such as a surveillance camera to the base (51) and then casing (52) is securely connected to the base (51) to protect the object inside the casing (52) from damage of any kind. Therefore, it is noted that the installation process of the fixing mount is too time consuming and inappropriate in that when the thickness of the ceiling is various from one another, the operator will have to purchase a different ceiling mount to adapt for this different ceiling thickness, which is still, a waste of money.

To overcome the shortcomings, the present invention tends to provide an improved ceiling mount to mitigate the aforementioned problems.

SUMMARY OF THE INVENTION

The primary objective of the present invention is to provide an improved ceiling mount capable of adjusting to different thickness of the ceiling so as to support a load onto the ceiling mount.

In order to accomplish the above objective, the ceiling mount of the present invention has two wings selectively extending out of a central rod so as to abut a side face of the ceiling to support the load which is attached to the base of the ceiling mount.

Other objects, advantages and novel features of the invention will become more apparent from the following detailed description when taken in conjunction with the accompanying drawings.

DETAILED DESCRIPTION OF THE PREFERRED EMBODIMENT

Figure 1:
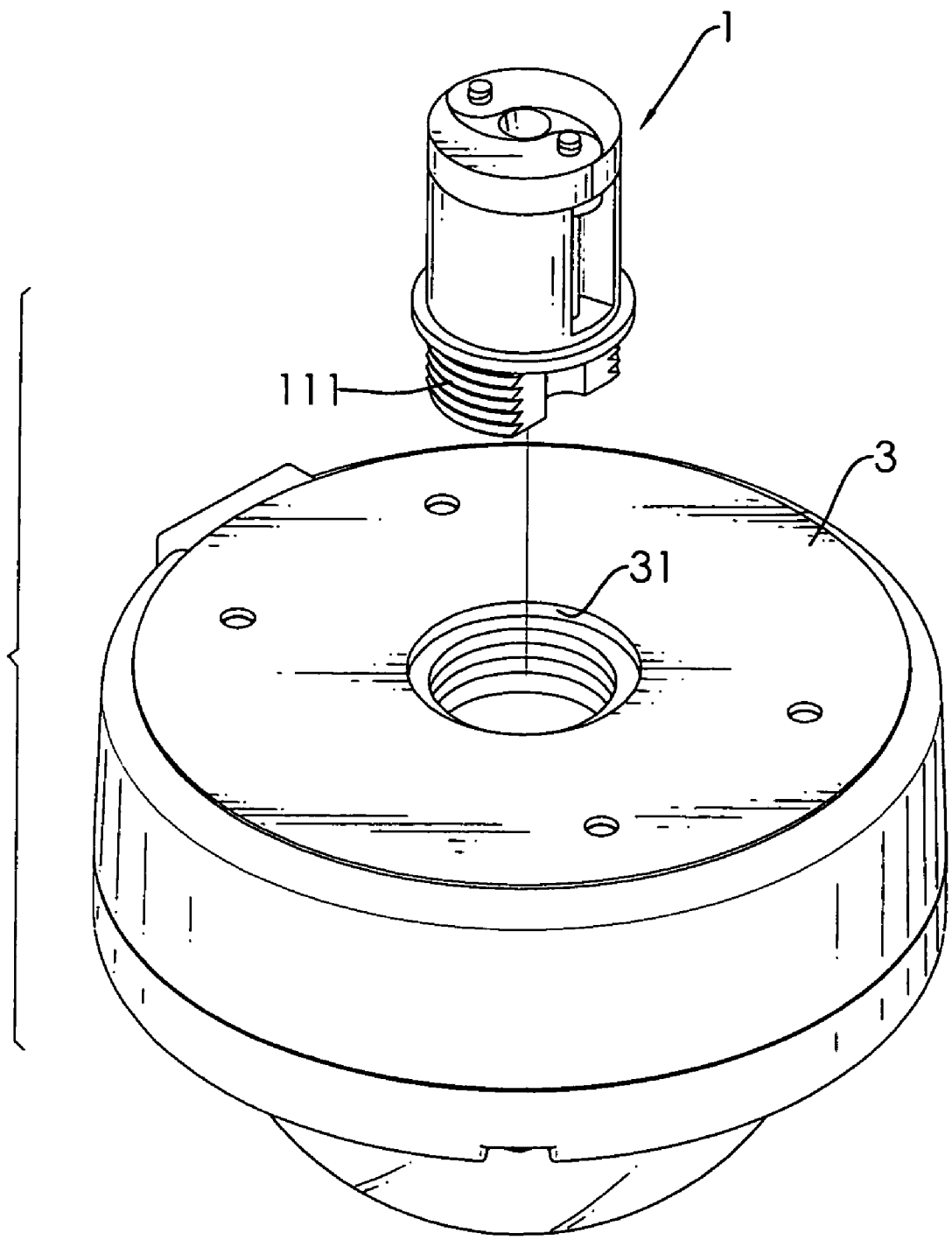
FIG. 1 is an exploded perspective view of the ceiling mount of the present invention.

With reference to FIG. 1, it is noted that the ceiling mount in accordance with the present invention includes a core (1) and a base (3). The base (3) is provided with a threaded hole (31) defined through a face of the base (3) to mesh with an outer threading (111) extending from the bottom of the core (1) such that the core (1) is able to detachably engage and combine with the base (3).

Figure 2:
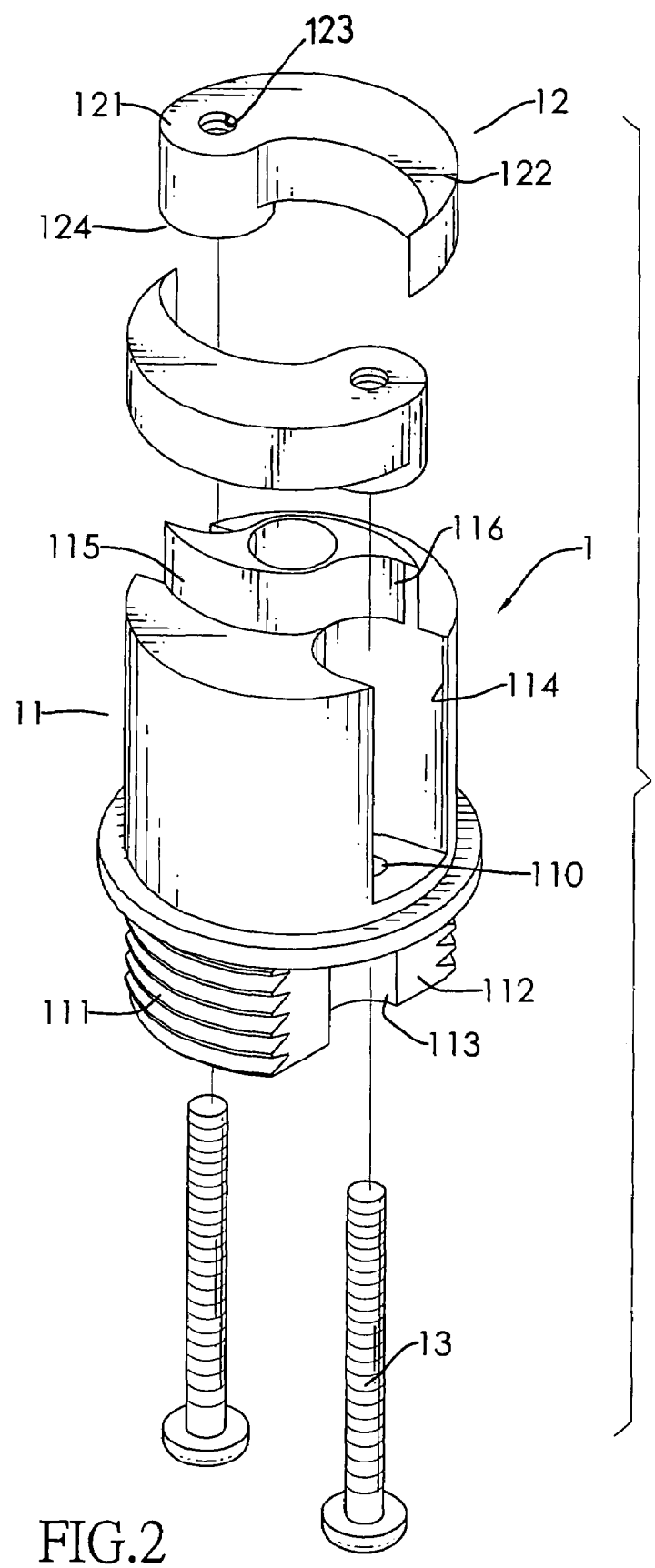
FIG. 2 is an exploded perspective view of the core of the ceiling mount of the present invention.

With reference to FIG. 2, it is noted that the core (1) of the present invention is composed of a cylindrical body (11) having the bottom extension formed at a lower portion of the cylindrical body (11), two arms (12) and two threaded bolts (13).

The cylindrical body (11) further has two cutouts (112) defined in two opposed sides of the bottom extension and a sectorial passage (113) is defined in a bottom face of each of the cutouts (112) to communicate with the cutouts (112) respectively. Two indentations (114) are oppositely defined in an outer periphery of the cylindrical body (11) to communicate with a corresponding one of the cutouts (112) via a first threaded hole (110) defined in a bottom face defining the indentation (114). A stop (115) is formed on a top end of the cylindrical body (11) and on two opposite sides of the stop (115), a sectorial cutout (116) is defined to conform to a perimeter of a corresponding one of the two indentations (114). A through hole (117) is defined through the cylindrical body (11) and the stop (115).

The two arms (12) are each arcuate in shape in this embodiment, but the shape of the two arms (12) should not be limited only to the embodiment shown. Each arm (12) is provided with a sectorial head (121) dimensioned to be snugly fitted in the sectorial cutout (116) and the indentation (114) of the cylindrical body (11) and an arcuate extension (122) integrally formed with an outer periphery of the sectorial head (121). The arcuate extension (122) is configured and dimensioned in such a way that an outer periphery thereof is in accordance with the outer periphery of the cylindrical body (11) when the sectorial head (121) is fully received in the sectorial cutout (116) of the stop (115). Each sectorial head (121) is further provided with a second threaded hole (123) communicating with a corresponding one of the two first threaded holes (110). Each of the two threaded bolts (13) is able to threadingly extend through the first threaded hole (11) in the bottom extension of the cylindrical body (11) and the second threaded hole (123) of the sectorial head (121). Furthermore, a cylindrical extension (124) is formed at a lower portion of the sectorial head (121) and dimensioned to fully conform to an outer contour of the sectorial head (121) so that the cylindrical extension (124) is able to be fully received in the indentation (114) of the cylindrical body (11).

With reference to FIGS. 3A, 3B, 4A and 4B, when the core (1) of the present invention is assembled, each threaded bolt (13) is threadingly extended through a corresponding one of the two first threaded holes (11) of the cylindrical body (11) from a corresponding one of the sectorial passages (113) and into one of the two second threaded holes (123) of the arms (12). Thus due to the threading connection among the threaded bolts (13), the first threaded holes (110) and the threaded second holes (123), the threaded bolts (13) are secured to the cylindrical body (11).

Figure 3A:
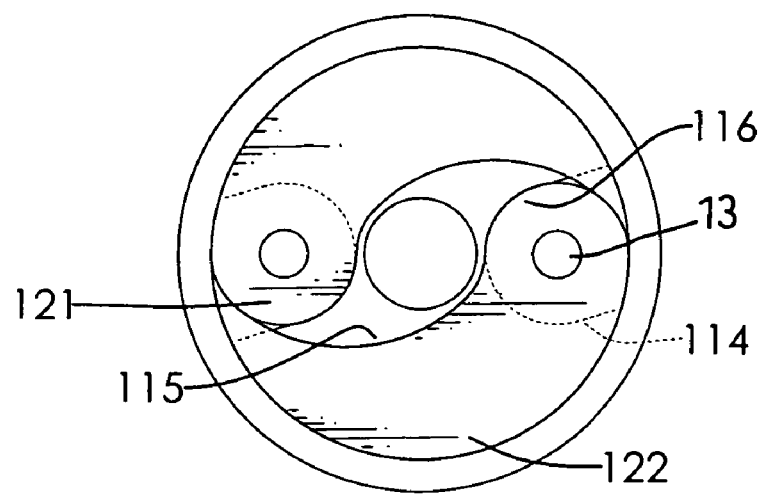
FIG. 3A is a top end view showing that the arms of the core are retracted.
Figure 3B:
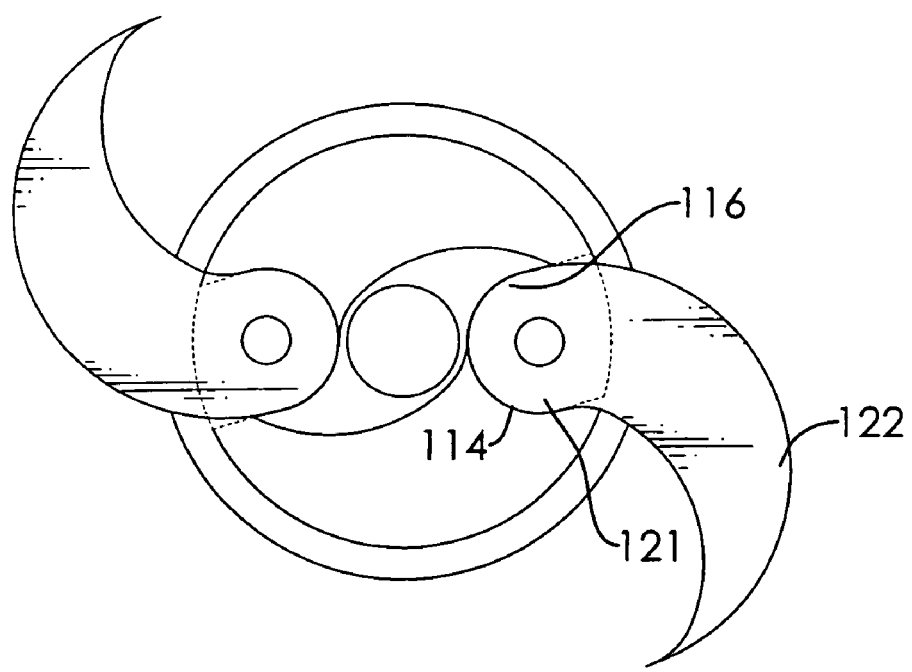
FIG. 3B is a top end view showing that the arms of the core are extended.
Figure 4A:
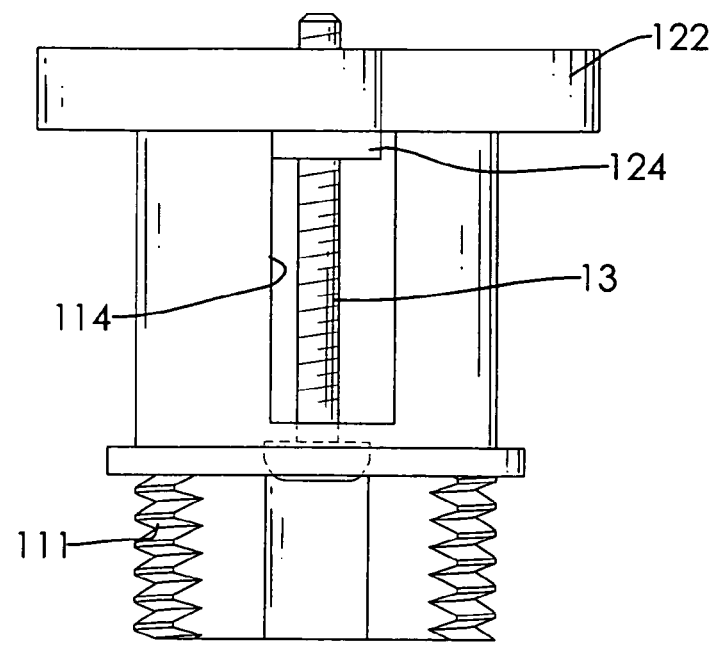
FIGS. 4A and 4B are schematic side plan views showing that the two extending arms are gradually descending in response to the rotation of the threaded bolts.
Figure 4B:
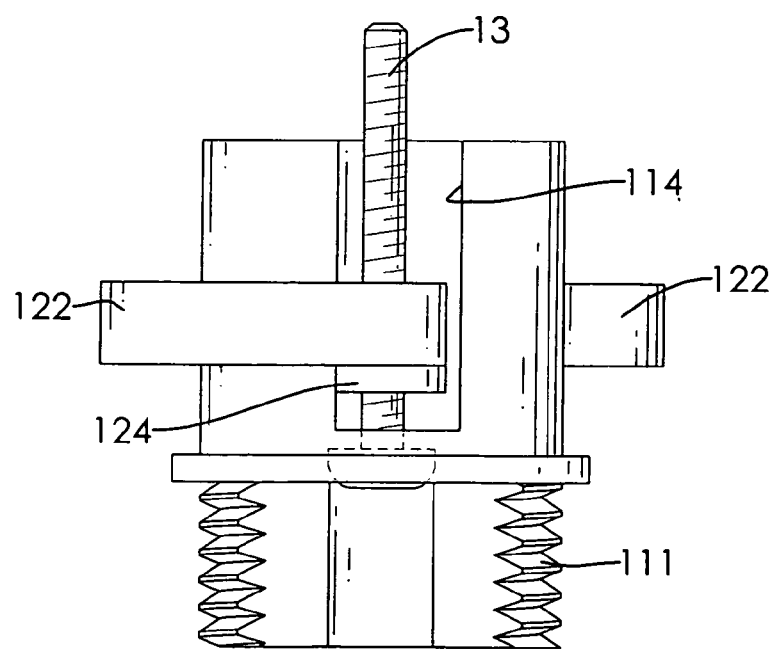

As shown in FIG. 3A, before rotation of the threaded bolt (13), the arcuate extension (122) is connected to an outer periphery of the stop (115) with the sectorial head (121) received in the sectorial cutout (116) of the stop (115) and the cylindrical extension (124) received in the indentation (114). Then after the threaded bolt (13) is rotated, initially the arcuate extension (122) is driven to rotate simultaneously due to the friction with the corresponding threaded bolt (13), which extends the arcuate extension (122) out of the cylindrical body (11), as shown in FIG. 3B. However, when the arcuate extension (122) is rotated to a degree where an outer periphery of the arcuate extension (122) abuts a free end of the stop (115), rotation of the arcuate extension (122) is stopped.

As the threaded bolt (13) continues to rotate, because the sectorial head (121) is snugly received in the indentation (14), the sectorial head (121) gradually descends in the indentation (114) when the threaded bolt (13) is rotated in a first direction. Alternately adjusting the position of the two arcuate extensions (122) is able to maintain the two arcuate extensions (122) at a horizontal level.

Figure 5:
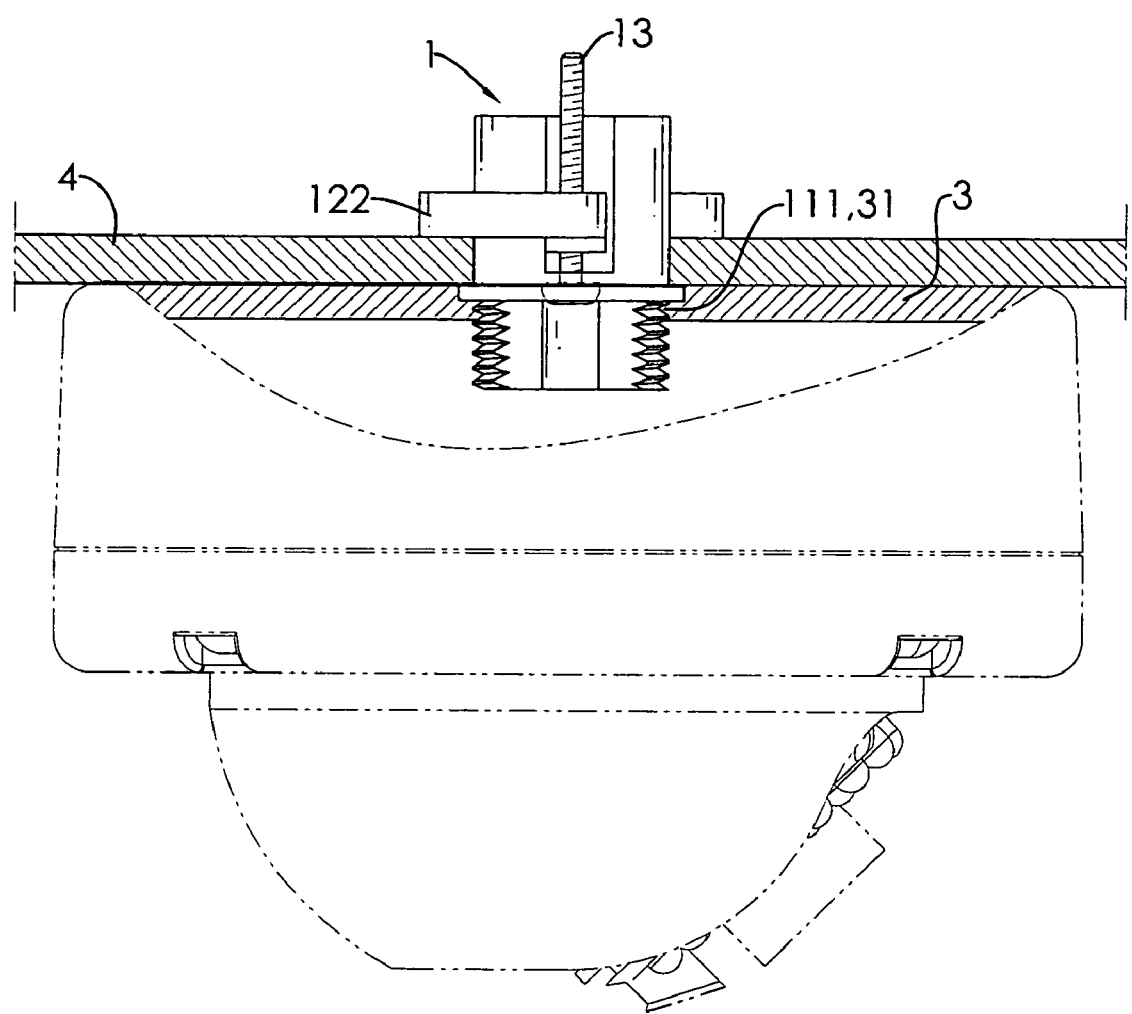
FIG. 5 is a schematic side plan view with partial in cross section showing that the two arms of the core abut a side face of the ceiling to support a load attached to the base of the ceiling mount.
Figure 6:
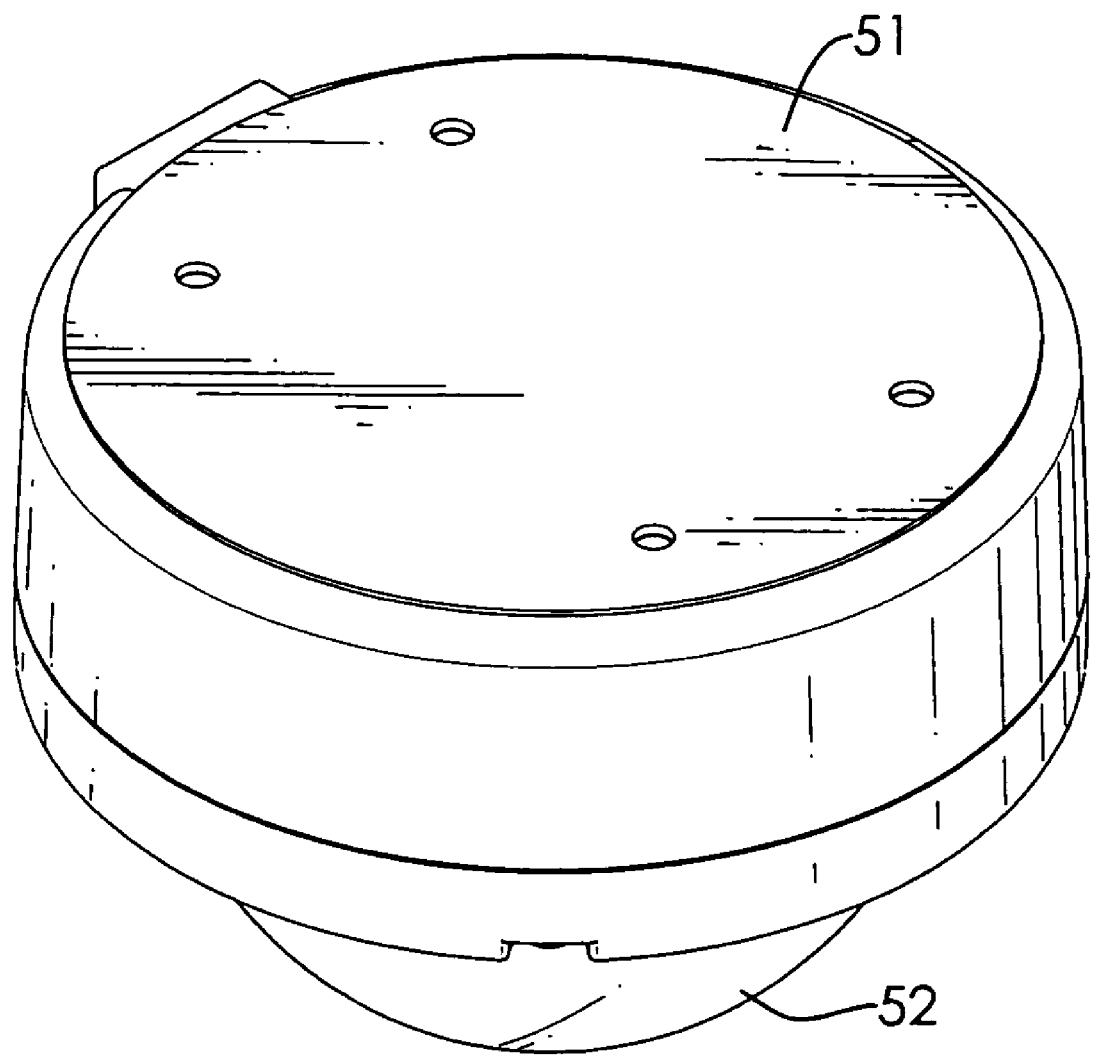
FIG. 6 is a perspective view showing a conventional fixing mount.

With reference to FIG. 5 and FIG. 1, it is noted that the outer threading (111) extending from the bottom of the cylindrical body (11) meshes with the threaded hole (31) of the base (3). Thereafter, the operator is able to alternately rotate each threaded bolt (13) to extend the two arcuate extensions (122). Because the base (3) is connected to one side of the ceiling (4), the two extended arcuate extensions (122) are able to gradually engage with the other side of the ceiling (4), which provides a supporting force to any load added to the base (3). For example, an illuminating instrument, e.g. a light tube, or surveillance camera may be mounted to the base (3) and the two extended arcuate extensions (122) are able to providing the required supporting force to the load attached to the base (3). Further, it may be appreciated that although the description above focuses on two arcuate extensions (122), one arcuate extension (122) may also accomplish the designated purpose.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A ceiling mount for attaching to a ceiling, the ceiling mount comprising:
    a base; and
    a core being mounted in and protruding from the base, said core capable of protruding through a ceiling and having
        a cylindrical body having
            a top;
            a bottom extension mounted in the base;
            two cutouts oppositely defined in said bottom extension;
            two sectorial passages communicating respectively with the two cutouts; and
            two indentations defined respectively in two opposite outer peripheries of the cylindrical body and communicating respectively with the two sectorial passages respectively via two first threaded holes;
    two threaded bolts respectively received in the sectorial passages and extending respectively into the indentations via the first threaded holes; and
    two arms connected respectively to the threaded bolts and rotating relative to the threaded bolts to move along the two indentations when the threaded bolts are rotated for supporting the core and the base mounted on the side of the ceiling corresponding to the base.

2. The ceiling mount as claimed in claim 1, wherein
    the base further has a threaded hole defined through a face of the base; and
    the cylindrical body of the core further has an outer threading formed on the bottom extension of the cylindrical body.

3. The ceiling mount as claimed in claim 2, wherein each arm has
    a sectional head connected to the corresponding threaded bolt; and
    an arcuate extension integrally extending from the sectorial head.

4. The ceiling mount as claimed in claim 3, wherein the stop further has two sectorial cutouts corresponding respectively to the sectorial heads of the arms, and each sectorial cutout is defined to snugly receive the sectorial head of the corresponding arm.

5. The ceiling mount as claimed in claim 4, wherein
    the sectorial head of each arm further has a top and a bottom and;
    each arm has
        a cylindrical extension formed on the bottom of the sectorial head and snugly received in the indentation corresponding to the threaded bolt connected to the arm; and
        a second threaded hole formed through the top and the bottom of the sectorial head to communicate with the corresponding indentation such that the threaded bolts are threadingly extended through the first threaded hole and into the second threaded hole to drive the arms to move relative to the threaded bolts.

6. The ceiling mount as claimed in claim 1 further comprising a stop formed on the top of the cylindrical body and between the two arms to separate the two arms.

7. The ceiling mount as claimed in claim 6, wherein each arm has
    a sectional head connected to the corresponding threaded bolt; and
    an arcuate extension integrally extending from the sectorial head.

8. The ceiling mount as claimed in claim 7, wherein the stop further has two sectorial cutouts corresponding respectively to the sectorial heads of the arms, and each sectorial cutout is defined to snugly receive the sectorial head of the corresponding arm.

9. The ceiling mount as claimed in claim 8, wherein
    the sectorial head of each arm further has a top and a bottom and;
    each arm has
        a cylindrical extension formed on the bottom of the sectorial head and snugly received in the indentation corresponding to the threaded bolt connected to the arm; and
        a second threaded hole formed through the top and the bottom of the sectorial head to communicate with the corresponding indentation such that the threaded bolts are threadingly extended through the first threaded hole and into the second threaded hole to drive the arms to move relative to the threaded bolts.

10. The ceiling mount as claimed in claim 1, wherein each arm has
   a sectional head connected to the corresponding threaded bolt and moving along the corresponding indentation; and
   an arcuate extension integrally extending from the sectorial head.

11. The ceiling mount as claimed in claim 10, wherein the stop further has two sectorial cutouts corresponding respectively to the sectorial heads of the arms, and each sectorial cutout is defined to snugly receive the sectorial head of the corresponding arm.

12. The ceiling mount as claimed in claim 11, wherein
   the sectorial head of each arm further has a top and a bottom and;
   each arm has
      a cylindrical extension formed on the bottom of the sectorial head and snugly received in the indentation corresponding to the threaded bolt connected to the arm; and
      a second threaded hole formed through the top and the bottom of the sectorial head to communicate with the corresponding indentations such that the threaded bolts are threadingly extended through the first threaded hole and into the second threaded hole to drive the arms to move relative to the threaded bolts.

13. The ceiling mount as claimed in claim 12, wherein the two arms are driven respectively by the two threaded bolts to rotate so that each arcuate extension of the two arms is able to extend out of the cylindrical body to a degree where an outer periphery of the arcuate extension abuts one of two ends of the stop, consequent rotation of the two threaded bolts drives the two sectorial heads to move inside the two indentations so that movement of the two arcuate extensions toward the base is able to clamp the ceiling to provide the supporting force.

* * * * *